(12) United States Patent
Awiszus

(10) Patent No.: US 8,271,340 B2
(45) Date of Patent: Sep. 18, 2012

(54) ORDER TAKING SYSTEM AND METHOD WITH LOCAL AND/OR REMOTE MONITORING

(75) Inventor: Steven T. Awiszus, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1248 days.

(21) Appl. No.: 11/276,050

(22) Filed: Feb. 10, 2006

(65) Prior Publication Data

US 2007/0208626 A1 Sep. 6, 2007

(51) Int. Cl.
*G06Q 30/00* (2006.01)
(52) U.S. Cl. .................. 705/26.1; 705/15; 705/27.1
(58) Field of Classification Search .............. 705/26, 705/27, 26.1, 27.1, 15
See application file for complete search history.

(56) References Cited

U.S. PATENT DOCUMENTS

| | | | |
|---|---|---|---|
| 5,321,848 A | 6/1994 | Miyahira et al. | |
| 5,644,630 A | 7/1997 | Durco, Jr. | |
| 6,435,406 B1 | 8/2002 | Pentel | |
| 6,574,603 B1 | 6/2003 | Dickson et al. | |
| 6,775,371 B2 * | 8/2004 | Elsey et al. | 379/218.01 |
| 6,993,292 B2 | 1/2006 | Sabongi et al. | |
| 2002/0076031 A1* | 6/2002 | Falcon et al. | 379/265.11 |
| 2003/0134666 A1 | 7/2003 | Fletcher et al. | |
| 2003/0162504 A1 | 8/2003 | Sabongi et al. | |
| 2003/0200147 A1 | 10/2003 | Sabongi et al. | |
| 2003/0225622 A1* | 12/2003 | Doan | 705/15 |
| 2004/0116071 A1 | 6/2004 | Hall | |
| 2004/0158499 A1 | 8/2004 | Dev et al. | |
| 2004/0218609 A1* | 11/2004 | Foster et al. | 370/401 |
| 2005/0004843 A1 | 1/2005 | Heflin | |
| 2005/0059414 A1 | 3/2005 | Mahmoodi et al. | |
| 2005/0277410 A1 | 12/2005 | Ismail et al. | |

(Continued)

FOREIGN PATENT DOCUMENTS

JP 2006-031487 2/2006

(Continued)

OTHER PUBLICATIONS

Meryhew, Richard, "Making fast food that much faster," Star Tribune. Minneapolis, Minn.: Jul. 27, 2004.*

(Continued)

*Primary Examiner* — Jeffrey A Smith
*Assistant Examiner* — Anne Georgalas
(74) *Attorney, Agent, or Firm* — David B Patchett

(57) ABSTRACT

An order taking system and method for an establishment enabling a customer to place an order for an item from the establishment. Order placing equipment is located near the establishment being capable of receiving the order for the item from the customer. A first voice communication link is established between local order placing equipment and a remote facility. A second voice communication link is established between the order placing equipment and the local order receiving facility. The order taking system is operable in a first mode operatively coupled via the first voice communication link between the order placing equipment and the remote facility and in a second mode operatively coupled via the second communication link between the order placing equipment to the local order taking facility. The order taking system allows the local order receiving facility to monitor voice communication between the order placing equipment and the remote facility when operable in the first mode and allowing the remote facility to monitor voice communication between the order placing equipment and the local order receiving facility when operable in the second mode.

8 Claims, 3 Drawing Sheets

U.S. PATENT DOCUMENTS

| | | | |
|---|---|---|---|
| 2006/0030269 A1 | 2/2006 | Sabongi et al. | |
| 2006/0041482 A1* | 2/2006 | Awiszus et al. | 705/26 |
| 2006/0045063 A1 | 3/2006 | Stanford et al. | |
| 2006/0233347 A1* | 10/2006 | Tong et al. | 379/265.06 |

FOREIGN PATENT DOCUMENTS

| | | |
|---|---|---|
| WO | WO-2006020398 | 2/2006 |

OTHER PUBLICATIONS

"Techno Tactics: Technology-based solutions help combat common drive-thru gripes," by Allison Perlik, Restaurants and Institutions, 115, 7: Apr. 15, 2005.*

Meryhew, Richard, "Making fast food that much faster," Star Tribune. Minneapolis, Minn.: Jul. 27, 2004, accessed Aug. 25, 2009.*

* cited by examiner

ORDER TAKING SYSTEM AND METHOD WITH LOCAL AND/OR REMOTE MONITORING

RELATED APPLICATION

This disclosure is related to the following co-pending application entitled "System and Method Providing Backup Local Ordering For Establishment Using a Remote Ordering System" by Awiszus (application Ser. No. 10/910,033); filed Aug. 3, 2004), which is not admitted as prior art with respect to the present disclosure by its mention in this section.

FIELD OF THE INVENTION

The present invention is generally related to order taking systems and, more particularly, to order taking systems using wireless intercom systems for commercial establishments.

BACKGROUND OF THE INVENTION

It is common for establishments, such as retail establishments, and particularly restaurants, to facilitate drive-up customers with drive-up lanes and windows to service the customer. A customer will typically drive up to a menu/order board and communicate the customer's wishes from the vehicle to staff, possibly including an order taker, inside the retail establishment. The customer, still in the vehicle, will then proceed to one or more windows in order to pay for the purchase, if required, and pick up the merchandise.

An intercom system can facilitate communication within and around the establishment, particularly between the occupant of the vehicle, the customer, and the staff inside the establishment. In a "quick service" restaurant situation, a post mounted speaker and microphone, located near a menu board, is hard wired to an intercom base station located inside the restaurant. The base station can wirelessly communicate with a portable device worn by an order taker. The portable device is typically a transceiver worn as a belt pack and an accompanied wired headset. Alternatively, in some instances, the portable device is self-contained on a wearable headset eliminating the need for a belt pack. The order taker typically listens continually to the post mounted microphone and presses a button in order to speak to the vehicle occupant as needed.

In many systems and methods of ordering items from an establishment from a drive-up or drive-thru facility, the order is orally communicated directly from the post-mounted speaker and microphone to an order taking facility, typically a drive-thru order specialist wearing a headset, in the establishment. The order specialist, or others, then collect the ordered item or items and handle the transaction with the customer at a drive-up window, taking money for the ordered item, making change and handing the order to the customer.

The drive-through ordering system is vitally important for a quick service restaurant. In some quick service restaurants, the drive-through is sixty percent (60%) or more of the revenue of the establishment. Thus, there is a great need for a reliable intercom system for use, for example, in obtaining orders from the drive-through facility. If the intercom system develops a fault, becomes mal-adjusted or otherwise malfunctions, the establishment may be unable to process orders from the drive-through facility not only preventing the establishment from booking the revenue which otherwise would have been obtained but also potentially alienating customers.

While systems and methods have been developed in which the order taking process is moved off-site from the establishment, for example, U.S. Patent Application Publication No. US2003/0225622, Doan, entitled "Method and System Entering Orders of Customers," such systems may not fully address issues associated with the processing of customer's orders.

While the afore-mentioned offsite system and method described in Doan allows shifting of duties and resources from the local establishment, the system and method also brings forth a host of additional issues and problems, usually of a type not occurring in previous, all-local ordering systems.

BRIEF SUMMARY OF THE INVENTION

Aspects of the present routes communication between order placing equipment associated with an establishment to the remote facility through the establishment using VoIP and establishing a second communications link in which local staff of the establishment can monitor order taking communication between the order placing equipment and the remote facility. Conversely, aspects of the present invention also allow staff associated with the remote facility to monitor order taking communication occurring between the order placing equipment and the local establishment.

This somewhat dual communication ordering system and method allows staff in the facility not being primarily responsible for communicating with the customer and taking the order to monitor, or eavesdrop, on the conversation. Such monitoring can greatly increase both the reliability and speed through which the customer ordering process occurs.

In an embodiment, the present invention provides an order taking system for an establishment enabling a customer to place an order for an item from the establishment. Order placing equipment is located near the establishment being capable of receiving the order for the item from the customer. A first voice communication link is established between local order placing equipment and a remote facility. A second voice communication link is established between the order placing equipment and the local order receiving facility. The order taking system is operable in a first mode operatively coupled via the first voice communication link between the order placing equipment and the remote facility and in a second mode operatively coupled via the second communication link between the order placing equipment to the local order taking facility. The order taking system allows the local order receiving facility to monitor voice communication between the order placing equipment and the remote facility when operable in the first mode and allowing the remote facility to monitor voice communication between the order placing equipment and the local order receiving facility when operable in the second mode.

In an embodiment, a data communications link between the remote facility and the local order receiving facility enables the order, if taken by the remote facility, to be visually communicated from the remote facility to the local order receiving facility.

In an embodiment, the present invention provides an order taking system for an establishment enabling a customer to place an order for an item from the establishment, the establishment having order fulfillment staff. Order placing equipment located near the establishment is capable of receiving the order for the item from the customer. A first voice communication link between the order placing equipment and the local order receiving facility allows two-way voice communication between the customer and the staff in order to receive the order from the customer. A second communication link with a remote facility allows the remote facility to monitor voice communication between the order placing equipment and a local order receiving facility.

In an embodiment, the present invention provides an order taking system for an establishment enabling a customer to place an order for an item from the establishment, the establishment having order fulfillment staff. Order placing equipment located near the establishment is capable of receiving the order for the item from the customer. A first voice communication link between the order placing equipment and a remote facility allows two-way voice between the customer and the remote facility in order to receive the order from the customer. A second communication link allows the staff to monitor voice communication between the order placing equipment and the remote facility.

In an embodiment, the present invention provides a food order taking system for a quick service restaurant enabling a customer to place a food order from the quick service restaurant. Order placing equipment located near a drive-through ordering lane of the quick service restaurant is capable of receiving the food order for the item from the customer. A first voice communication link is established between the order placing equipment and a remote facility. A second voice communication link is established between the order placing equipment and a local order receiving facility associated with the quick service restaurant. The order taking system is operable in a first mode operatively coupled via the first voice communication link between the order placing equipment and the remote facility and in a second mode operatively coupled via the second communication link between the order placing equipment and the local order taking facility. The order taking system allows the local order receiving facility to monitor voice communication between the order placing equipment and the remote facility when operable in the first mode and allows the remote facility to monitor voice communication between the order placing equipment and the local order receiving facility when operable in the second mode.

In an embodiment, the present invention provides a food order taking system for a quick service restaurant enabling a customer to place a food order for an item from the quick service restaurant, the quick service restaurant having order fulfillment staff. Order placing equipment located near a drive through ordering lane of the quick service restaurant is capable of receiving a food order for the item from the customer. A first voice communication link between the order placing equipment and a local order receiving facility allows two-way voice communication between the customer and the staff in order to receive the order from the customer. A second communication link with a remote facility allows the remote facility to monitor voice communication between the order placing equipment and the local order receiving facility.

In an embodiment, the present invention provides a food order taking system for a quick service restaurant enabling a customer to place a food order for an item from the quick service restaurant, the quick service restaurant having order fulfillment staff. Order placing equipment located near a drive through ordering lane of the quick service restaurant is capable of receiving a food order for the item from the customer. A first voice communication link is established between the order placing equipment and a remote facility allows two-way voice between the customer and the remote facility in order to receive the order from the customer. A second communication link allows the staff to monitor voice communication between the order placing equipment and the remote facility.

In an embodiment, the present invention provides a method of taking an order for an establishment enabling a customer to place an order for an item from the establishment, the establishment having order placing equipment located near the establishment being capable of receiving the order for the item from the customer. A first voice communication link is used to communicate between the order placing equipment associated with the establishment and a remote facility. A second voice communication link is used to communicate between the order placing equipment and a local order receiving facility. Switching occurs from a first mode in which the order taking system is operable to communicate the order between the order placing equipment and the remote facility and a second mode in which the order taking system is operable to communicate the order between the order placing equipment and the local order receiving facility. The first voice communication link is monitored by the local order receiving facility in the first mode. The second voice communication link is monitored by the remote facility in the second mode.

In an embodiment, the present invention provides a method of taking an order for an establishment enabling a customer to place an order for an item from the establishment, the establishment having order placing equipment located near the establishment being capable of receiving the order for the item from the customer. The order is communicated from the order placing equipment to a local order receiving facility. The order is monitored by the remote facility.

In an embodiment, the present invention provides a method of taking an order for an establishment enabling a customer to place an order for an item from the establishment, the establishment having order placing equipment located near the establishment being capable of receiving the order for the item from the customer. The order is communicated from the order placing equipment to a remote facility. The order is monitored by a local order receiving facility.

In an embodiment, the present invention provides a method of taking a food order for a quick service restaurant enabling a customer to place a food order for an item from the establishment, the establishment having order placing equipment located near a drive through lane associated with the establishment being capable of receiving the order for the item from the customer. A first voice communication link is used to communicate between the order placing equipment and a remote facility. A second voice communication link is used to communicate between the order placing equipment and a local order receiving facility. Switching occurs from a first mode in which the order taking system is operable to communicate the order between the order placing equipment and the remote facility and a second mode in which the order taking system is operable to communicate the order between the order placing equipment and the local order receiving facility. The first voice communication link is monitored by the local order receiving facility in the first mode. The second voice communication link is monitored by the remote facility in the second mode.

In an embodiment, the present invention provides a method of taking a food order for a quick service restaurant enabling a customer to place a food order for an item from the establishment, the establishment having order placing equipment located near a drive through lane associated with the establishment being capable of receiving the order for the item from the customer. The order is communicated from the order placing equipment to a local order receiving facility. The order is monitored by the remote facility.

In an embodiment, the present invention provides a method of taking a food order for a quick service restaurant enabling a customer to place a food order for an item from the establishment, the establishment having order placing equipment located near a drive through lane associated with the establishment being capable of receiving the order for the item from the customer. The order is communicated from the order placing equipment to a remote facility. The order is monitored by a local order receiving facility.

In an embodiment, a data communications link between said remote facility and said local order receiving facility enables said order, if taken by said remote facility, to be visually communicated from said remote facility to said local order receiving facility.

In an embodiment, the first voice communication link is hardwired.

In an embodiment, the first voice communication link is wireless.

In an embodiment, the second communication link, at least in part, comprises the internet.

DETAILED DESCRIPTION OF THE INVENTION

The contents of co-pending United States patent application entitled "System and Method Providing Backup Local Ordering For Establishment Using a Remote Ordering System" by Awiszus (Docket No. 59861US002) (application Ser. No. 10/910,033); filed Aug. 3, 2004), is hereby incorporated by reference in its entirety.

Figure 1:
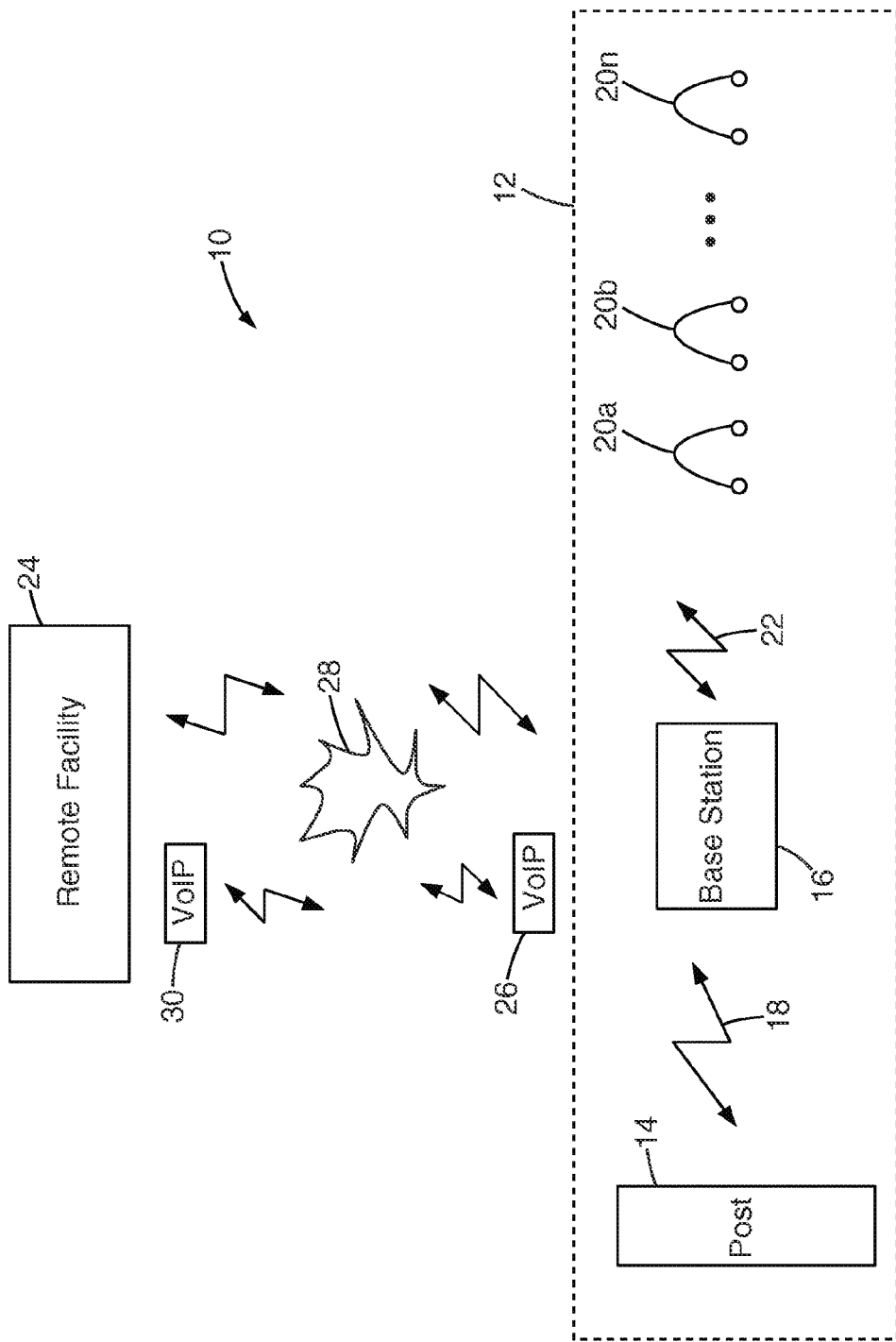
FIG. 1 is a block diagram of the functional components of an ordering system.

FIG. 1 illustrates a block diagram of an order taking system 10 for an establishment 12, such as a quick service restaurant. Establishment 10 has order placing equipment 14, typically an communication post associated with or near a menu board, placed near a drive-through ordering lane which customers may approach in their vehicles and verbally order directly from their vehicle using communication equipment located in or associated with the communication post. Such order placing equipment 14 is coupled in verbal communication with base station 16 located in establishment 12 using communication link 18. Communication link 18 may be hard-wired, or preferably, may be a wireless communication link.

Base station 16 communicates wirelessly with a plurality of headsets 20a, 20b, . . . 20n on wireless communication link 22. Headsets 20a, 20b, . . . 20n are worn by personnel, or staff of establishment 12, one or more of whom may either communicate with a customer communicating through order placing equipment 14 or monitor oral communication with order placing equipment 14. At least one of the staff members may communicate with a customer in the drive-through facility using order placing equipment 14 to obtain an order from the customer. Staff members may be wearing, and communicating through, one of headsets 20a, 20b, . . . 20n or may be in wired communication with base station 16. Other staff members will wear headsets 20a, 20b, . . . 20n or the remaining ones of headsets 20a, 20b, . . . 20n, primarily to listen, or monitor communication between the customer and staff member taking the order. Thus, a communication link using communication link 18 and wireless communication link 22 connects personnel of establishment 12 with a customer located at order placing equipment 14.

Establishment 12 is also orally connected to remote facility 24 using VoIP converter 26 at the establishment 12 end, through a wideband network 28, such as the internet, and through VoIP converter 30 at remote facility 24 end. This communication link using link 18, VoIP converter 26, wideband network 28 and VoIP converter 30 allows personnel associated with remote facility 24 to be in voice communication with a customer of establishment 12 located at order placing equipment 14 near establishment 12. Preferably, such communication is full duplex. Remote facility 24 may be located any distance away from establishment 12 and may be a facility that services a plurality of establishments like or similar to establishment 12.

Personnel in remote facility 24 may converse with a customer through order placing equipment 14 and take the customer's order for establishment 12. An order received by personnel associated with remote facility 24 may enter the customer's order and transmit the order to establishment 12 using standard digital communication techniques and wideband network 28. As an example, the order thus communicated could be made available to establishment 12 visually, as, for example, on a monitor showing orders and, possibly, the progress of those orders. Thus, the customer's order, once taken by personnel associated with remote facility 24, is then available to personnel of establishment 12. However, personnel of establishment 12 are relieved of the primary responsibility of receiving the order directly from the customer and, thus, can be freed to perform other necessary duties. The remote facility, handling orders for a plurality of establishments, possibly located in diverse time zones, can more easily spread peaks and valleys of customer orders to be more uniform over a period of time.

However, it may be desirable for personnel of establishment 12 to be able to monitor the ordering conversation between the customer at order placing equipment 14 and remote facility 24. For example, monitoring by local personnel of an order being taken remotely allows local staff to listen in on special orders, say "extra mayo" on a hamburger, so that the local can better understand the special order when the order comes through and possibly to allow local staff to get a jump on the special order even before the official order comes through. The cooks, for example, can hear the conversation and better understand what is being ordered and what will be required of them in the near future.

Second, monitoring by local personnel of an order being taken remotely allows local staff to "break into" an order taking conversation and alert the customer and the order taker about special circumstances surrounding the customers order. For example, local personnel may realize that the product selected by the customer for the order is currently out of stock at the establishment's location. Early intervention into the ordering process can allow a substitute order to be obtained from the customer before the customer leaves the order placing equipment 14.

Third, monitoring by local personnel of an order being taken remotely allows the speed of order fulfillment to be increased. Since the local personnel are hearing the order as it is being given, local personnel may be able to get a jump on the order and start the order even before the order is fully completed.

Fourth, monitoring by local personnel of an order being taken remotely allows the order taking process to adapt to local language issues. If the customer and the remote order taking facility are having difficulty communicating, perhaps either hearing or understanding the other, the local personnel can step in and assist with the language issues. Since many language issues are locally based, such intervention can help alleviate language issues during order taking.

Fifth, monitoring by local personnel of an order being taken remotely can allow for continuity of service in the event of a communication interruption from the order placing equipment and the remote facility. Since, in a preferred embodiment, the remote communication link utilizes VoIP and relies on the internet, it is possible that communication interruptions, although usually brief, can occur from time to time. If this should occur during the placement of an order, local personnel already monitoring the conversation can more seamlessly intervene and continue the order taking process in the event of loss of remote communications.

It is also possible for personnel of establishment 12 to be primarily responsible for conversing with the customer through order placing equipment 14. In this way, local staff receives the customer's order in a more conventional manner and also prepares and delivers the order. In this situation, it is also desirable that personnel in remote facility 24 be able to monitor the order taking conversation between the customer and the local establishment 12. Monitoring by remote personnel of an order being taken locally allows staff in the remote facility to listen in on the order taking process to monitor for quality control purposes and help to ensure that all establishments in the business chain associated with the remote facility are consistently meeting corporate business standards and objectives. This can also help to ensure a consistent ordering process from establishment to establishment within the same business chain.

It is also contemplated that both methods of ordering may be utilized. At any given point in time, either the local establishment may be primarily responsible for receiving the customer's order or the remote facility may be primarily so responsible. In either case, the location not primarily responsible for receiving the customer's order may be able to monitor the conversation actually occurring with the other location. Monitoring of local conversations by personnel associated with remote facility 24 or monitoring of remote conversations by local personnel of establishment 12, or both, is possible.

It is also contemplated that either the remote location or the local location may be primarily responsible for receiving the customer's order at any given point in time. It is also contemplated that it may be desirable or necessary to switch primary ordering responsibility, and, hence, customer conversation, from one location to the other.

Such switching may occur automatically. For example, the remote location could be primarily responsible ordering unless a disruption in wideband communication occurs. In that event, primary responsibility for ordering could automatically occur. As an example, an alarm could activate alerting personnel of establishment 12 to the change in responsibility.

Alternatively, switching could occur under manual control of either location. For example, local personnel of establishment 12 could assign primary responsibility to remote facility 24 at times of excessive ordering traffic and then retake primary responsibility when desired. In this case, the local establishment could have an override on responsibility, i.e., the local establishment would be responsible unless such primary responsibility were assigned to remote facility 24 and could take back such primary responsibility whenever desired or when it appears that communication problems with remote facility 24 are encountered. Alternatively, remote facility 24 could be primarily responsible and could override responsibility from local establishment 12.

Although the invention has been described until this point in terms of a general establishment, it is to be recognized and understood that preferred embodiments of the invention involve a customer placing a food order from a drive-through lane of a quick service restaurant. The customer order is for a food order and the establishment in a quick service restaurant.

Figure 2:
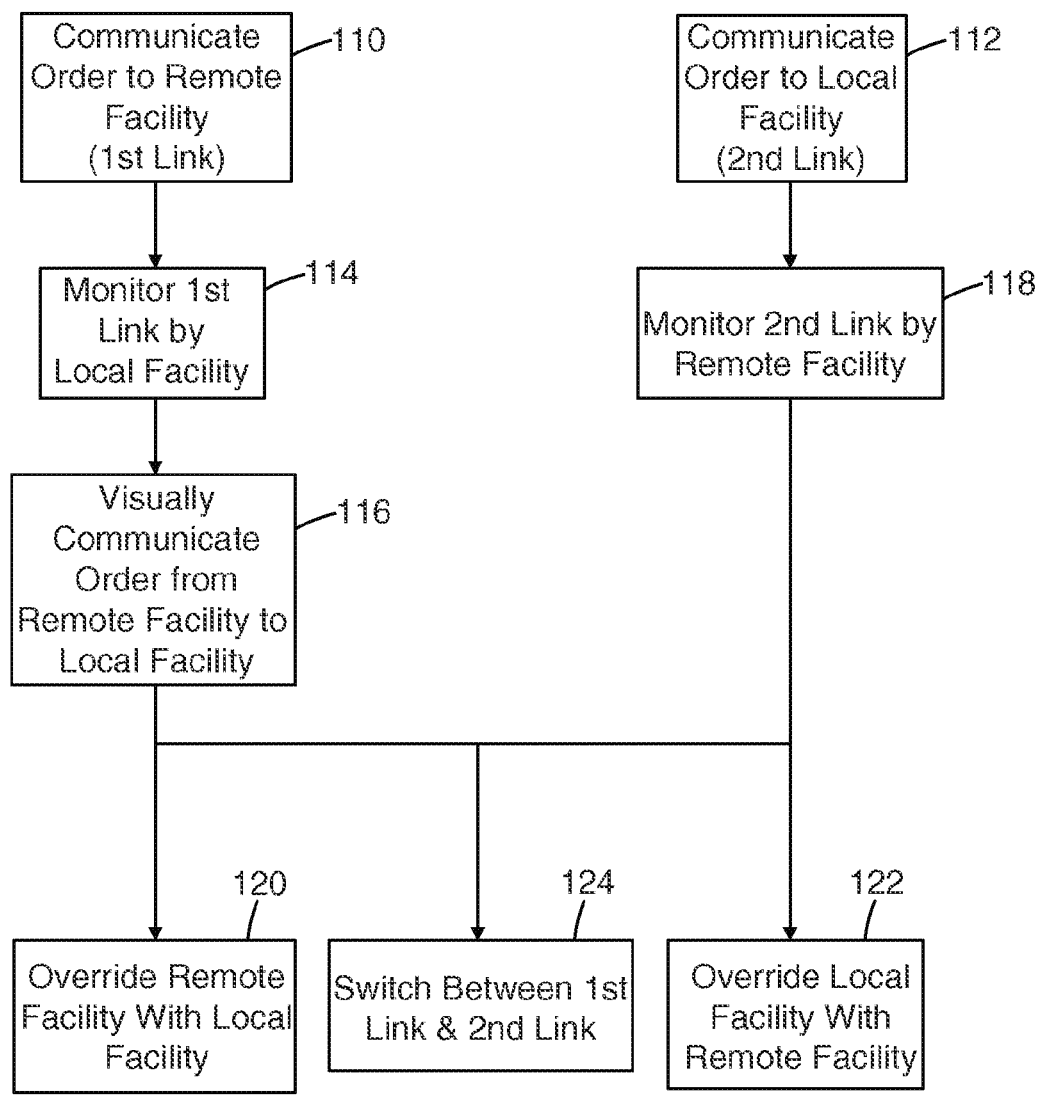
FIG. 2 is flow chart illustrating dual monitoring of ordering taking communication.

FIG. 2 is a flow chart illustrating a dual monitoring method. The method begins either by communicating (110) the customer's order to remote facility 24 or by communicating (112) the customer's order to local establishment 12.

If the customer's order is communicated (110) to remote facility 24 using a first communication link consisting of communication link 18, VoIP converter 18, network 28 and VoIP converter 30, the oral conversation can be monitored (114) by personnel of local establishment 12. Such monitoring achieves one or more of the advantageous results identified above. Optionally, the order is visually communicated (116) from remote facility 24 to local establishment 12 where personnel of establishment 12 may prepare the order and deliver the order to the customer.

Alternatively, if the customer's order is communicated (112) to local establishment 12 using a second communication link consisting of communication link 18 and wireless communication link 22, the oral conversation can be monitored (118) by personnel of remote facility 24. Such monitoring may achieve the advantage identified above.

If the customer's order is communicated (110) to remote facility 24, local establishment 12 may override (120) such communication and essentially take over primary ordering responsibility for receiving the customer's order.

If, on the other hand, the customer's order is communicated (112) to local establishment 12, remote facility may override (122) such communication and essentially take over primary ordering responsibility for receiving the customer's order.

Alternatively or in addition, communication may be switched (124), either manually or automatically, between the first communication link connecting order placing equipment 14 with remote facility 24 and the second communication link connecting order placing equipment 14 and local establishment 12. Such switching means the transfer of primary order receiving responsibility from one location to the other location. The location not having primary responsibility for receiving a customer's order could, if so desired, monitor the communication between the order placing equipment and the other location. Such switching could, for example, entail enabling (primary order receiving responsibility) or disabling communication from one of the locations to the order placing equipment. If such communication from one of the locations to the order placing equipment were enabled, then such location could both hear the conversation and speak to the customer. If such communication from one of the locations to the order placing equipment were disabled, then such location could hear the conversation but could not speak to the customer.

Figure 3:
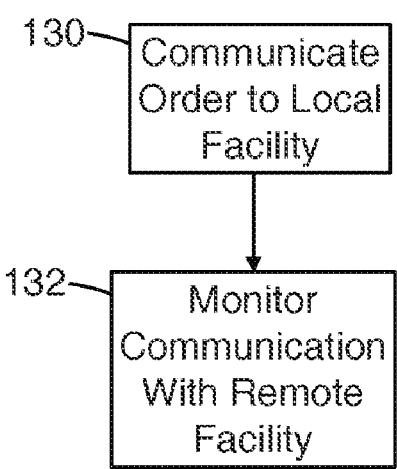
FIG. 3 is flow chart illustrating remote monitoring of local ordering taking communication.

FIG. 3 is a flow chart illustrating a remote monitoring method. The customer's order is communicated (130) to local establishment 12 using a communication link consisting of communication link 18 and wireless communication link 22. The oral conversation can be monitored (132) by personnel of remote facility 24.

Figure 4:
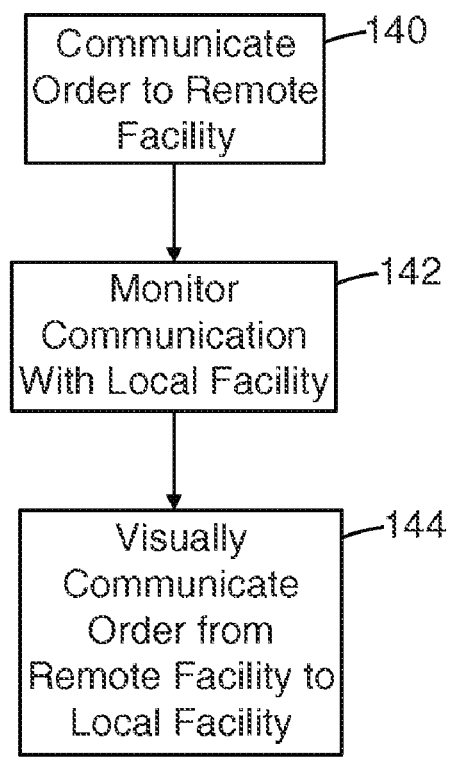
FIG. 4 is flow chart illustrating local monitoring of remote ordering taking communication.

FIG. 4 is a flow chart illustrating a local monitoring method. The customer's order is communicated (140) to remote facility 24 using a communication link consisting of communication link 18, VoIP converter 18, network 28 and VoIP converter 30. The oral conversation can be monitored (142) by personnel of local establishment 12. Optionally, the order is visually communicated (144) from remote facility 24 to local establishment 12 where personnel of establishment 12 may prepare the order and deliver the order to the customer.

Thus, embodiments of the order taking system & method with local and/or remote monitoring are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A method of taking an order for an establishment enabling a customer to place an order for an item from said establishment, said establishment having order placing equipment located near said establishment being capable of receiving said order for said item from said customer, comprising the steps of:
    using a first voice communication link to communicate between said order placing equipment associated with said establishment and a remote facility; and
    using a second voice communication link to communicate between said order placing equipment and a local order receiving facility at said establishment;
    switching from a first mode in which said order taking system is operable to communicate said order between said order placing equipment and said remote facility and a second mode in which said order taking system is operable to communicate said order between said order placing equipment and said local order receiving facility;
    activating an alarm to alert personnel of the switching;
    monitoring said first voice communication link from said local order receiving facility in said first mode; and
    monitoring said second voice communication link from said remote facility in said second mode.

2. A method as in claim 1 further comprising the step of visually communicating said order taken by said remote facility to said local order receiving facility.

3. A method as in claim 1 further comprising the step of overriding said first mode with said second mode by said local order receiving facility.

4. A method as in claim 1 further comprising the step of overriding said second mode with said first mode by said remote facility.

5. A method of taking a food order for a quick service restaurant establishment enabling a customer to place a food order for an item from said establishment, said establishment having order placing equipment located near a drive through lane associated with said establishment being capable of receiving said order for said item from said customer, comprising the steps of:
    using a first voice communication link to communicate between said order placing equipment and a remote facility; and
    using a second voice communication link to communicate between said order placing equipment and a local order receiving facility wherein said order placing equipment and said local order receiving facility are at said establishment;
    switching from a first mode in which said order taking system is operable to communicate said order between said order placing equipment and said remote facility, wherein said remote facility has primary order receiving responsibility, and a second mode in which said order taking system is operable to communicate said order between said order placing equipment and said local order receiving facility, wherein said local facility has primary order receiving responsibility;
    monitoring said first voice communication link from said local order receiving facility in said first mode including disabling communication from said local order receiving facility to said order placing equipment;
    monitoring said second voice communication link from said remote facility in said second mode including disabling communication from said remote order receiving facility to said order placing equipment.

6. A method as in claim 5 further comprising the step of visually communicating said order taken by said remote facility to said local order receiving facility.

7. A method as in claim 5 further comprising the step of overriding said first mode with said second mode by said local order receiving facility.

8. A method as in claim 5 further comprising the step of overriding said second mode with said first mode by said remote facility.

* * * * *